United States Patent [19]

Herron

[11] Patent Number: 4,636,808

[45] Date of Patent: Jan. 13, 1987

[54] CONTINUOUS INK JET PRINTER

[75] Inventor: Denver A. Herron, Dayton, Ohio

[73] Assignee: Eastman Kodak Company, Rochester, N.Y.

[21] Appl. No.: 773,497

[22] Filed: Sep. 9, 1985

[51] Int. Cl.[4] .............................................. G01D 15/18

[52] U.S. Cl. ....................................................... 346/75

[58] Field of Search .................................... 346/1.1, 75

[56] References Cited

U.S. PATENT DOCUMENTS

| | | | |
|---|---|---|---|
| 2,577,894 | 1/1948 | Jacob | 346/75 |
| 3,334,351 | 6/1965 | Stauffer | 346/75 |
| 3,579,721 | 5/1971 | Kaltenbach | 425/3 X |
| 3,656,171 | 4/1972 | Robertson | 346/1.1 |
| 3,949,410 | 4/1976 | Bassous et al. | 346/75 |
| 4,123,760 | 10/1978 | Hou | 346/75 |
| 4,250,510 | 2/1981 | Dressler | 346/75 |
| 4,275,401 | 6/1981 | Burnett et al. | 346/75 |
| 4,560,991 | 12/1985 | Schutrum | 346/75 |

*Primary Examiner*—E. A. Goldberg
*Assistant Examiner*—Gerald E. Preston
*Attorney, Agent, or Firm*—Thomas H. Close

[57] ABSTRACT

In an ink jet print head for a continuous type ink jet printer, both drop charging and drop deflection are achieved by a single, nonextended, planar electrode disposed adjacent the drop separation point of the ink jet filament, eliminating the need for separate drop deflection electrodes or extended drop charging electrodes for achieving drop deflection, and simplifying the construction of the ink jet print head.

4 Claims, 4 Drawing Figures

CONTINUOUS INK JET PRINTER

TECHNICAL FIELD

The present invention relates to a print head for a continuous ink jet printer, and more particularly, to means for charging and deflecting ink drops in such a print head.

BACKGROUND ART

In a continuous type (as distinguished from drop on demand type) ink jet printer, conductive ink is forced through an orifice to form an ink filament. The ink is vibrated at a constant frequency to cause drops to regularly separate from the end of the filament. A drop charging electrode located in the vicinity of the drop separation point is employed to selectively induce an electric charge on the conductive ink filament at the instant of drop separation. The separating drop captures the electric charge induced on the filament, and the charged drop is electrostatically deflected, for example to a drop catcher.

In a continuous binary type ink jet printer, all charged drops are deflected along a catch trajectory to a drop catcher, and uncharged drops proceed along a print trajectory to a print receiving surface such as paper.

In another type of ink jet printer, various amounts of charge are selectively placed on the drops to deflect the drops along respective print trajectories, or along a catch trajectory.

The print head of a prior art continuous ink jet printer generally includes a reservoir for delivering the conductive ink, under pressure, to an ink jet orifice; means for vibrating the ink, such as a piezoelectric transducer attached to the reservoir; a charging electrode for selectively charging the ink drops as they separate from the filament; means for deflecting the charged drops; and means for catching nonprinting drops.

In many prior art ink jet printing heads for continuous ink jet printing, the charging electrode is a small cylindrical conductor, generally formed by plating the inside of a microscopic hole in an insulating sheet of material. The means provided for deflecting the charged ink drops generally comprises a pair of deflection electrodes, arranged like the plates of an air capacitor, to which a constant deflection voltage is applied to establish an electrostatic deflection field between the plates. The ink drops travel between the plates, and the charged drops are deflected by the electric field.

U.S. Pat. No. 3,656,171, issued Apr. 11, 1972 to J. A. Robertson, discloses an ink jet printing head for continuous ink jet printing, wherein the drop charging electrode is simply a plate disposed adjacent the ink jet filament in the vicinity of drop separation, and the means for deflecting the ink drops is simplified to an electrically conductive surface that is arranged along one side of the path of the ink drops. The construction of such an ink jet printing head was substantially simpler than the prior art ink jet print heads.

The theory proposed by Robertson regarding the operation of the deflection means was that the charged ink drops induced a mirror charge in the conductive surface. The charged drops were then attracted to their mirror images, thereby causing the deflection. This arrangement had the advantage of simplifying the construction of the ink jet printing head by eliminating one half of the previously required deflection electrode structure, and eliminating the need for a separate high voltage power supply to charge the deflection electrodes in the ink jet printer apparatus.

It was further noted by Robertson that the deflection means may comprise an extension of the charging electrode, thereby further simplifying the construction of the ink jet print head.

Such an arrangement is shown in FIG. 3, where an ink jet printing head 10 includes an ink reservoir 12 containing conductive ink 14 under pressure. The ink is forced from an an orifice 16 to form an ink filament 18. The ink is vibrated by means not shown, to cause ink drops 20 to regularly separate from the ink filament 18. The ink drops 20 are selectively charged by a voltage $V_C$ applied to an extended drop charging electrode 22 from a charging circuit 24. Charged drops are deflected into a drop catcher 26, and uncharged drops proceed to the printing surface 28.

Although this approach has the advantage of eliminating all together the need for a separate deflection electrode, the extended charging electrode protrudes into the region where deflected drops may impact on the vertical face of the drop catcher. This is undesirable, since the conductive ink stream may then ground the charging electrode to the ink supply, or in the case of a multi-jet print head, short adjacent charging electrodes. It is the object of the present invention therefore to provide a simplified ink jet printing head of the type having a simple planar drop charging electrode located adjacent an ink jet filament in the region of the drop separation, that is free from the shortcomings noted above.

DISCLOSURE OF THE INVENTION

The object of the invention is achieved by eliminating any separate means for drop deflection from the ink jet print head. The inventor has determined that adequate deflection of charged drops is achieved by the nearly instantaneous interaction between the drop and the planar drop charging electrode alone, without the need for separate drop deflection electrodes, or extended drop charging electrodes to cause drop deflection. The continuous ink jet printing head according to the present invention charges and deflects ink drops into a vertical catcher face with a single, nonextended, planar electrode located above the drop catcher face. The term 'nonextended' means that the drop charging electrode does not extend onto the drop catching face.

According to a preferred mode of practicing the invention, the planar nonextended drop charging electrode is between 1 and 6 drop spacings long. The ink drop catcher is comprised of a molded plastic material.

MODES OF CARRYING OUT THE INVENTION

Figure 1:
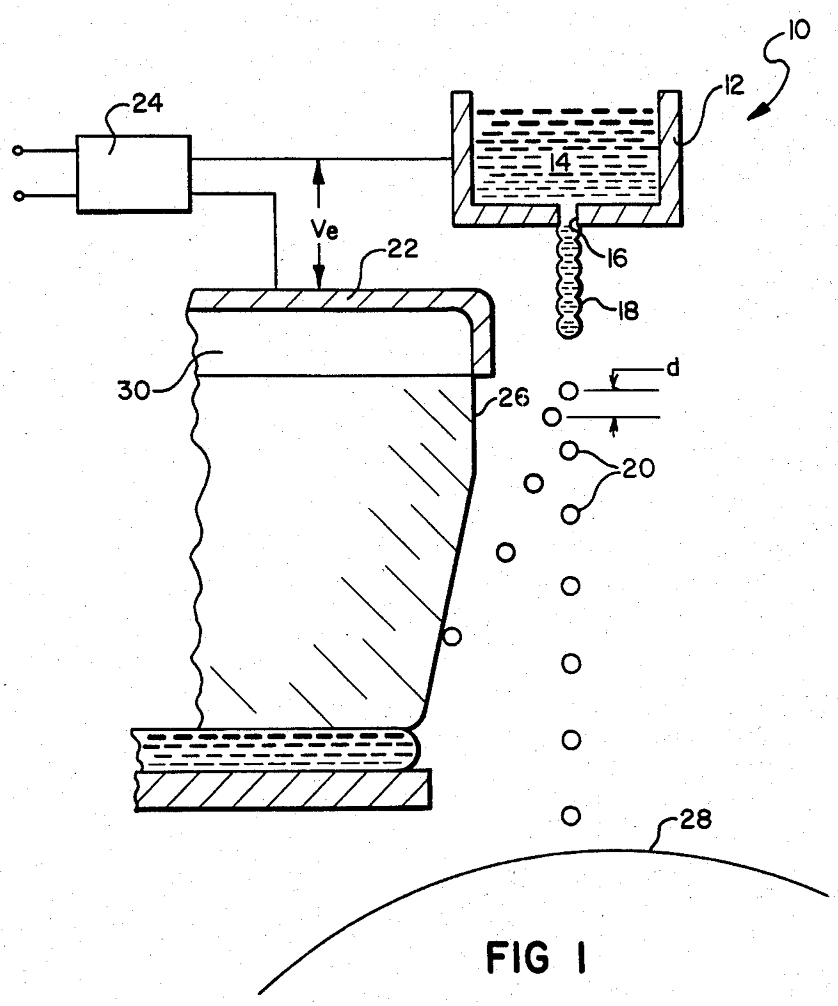
FIG. 1 is a schematic diagram of an ink jet print head according to the present invention.
Figure 3:
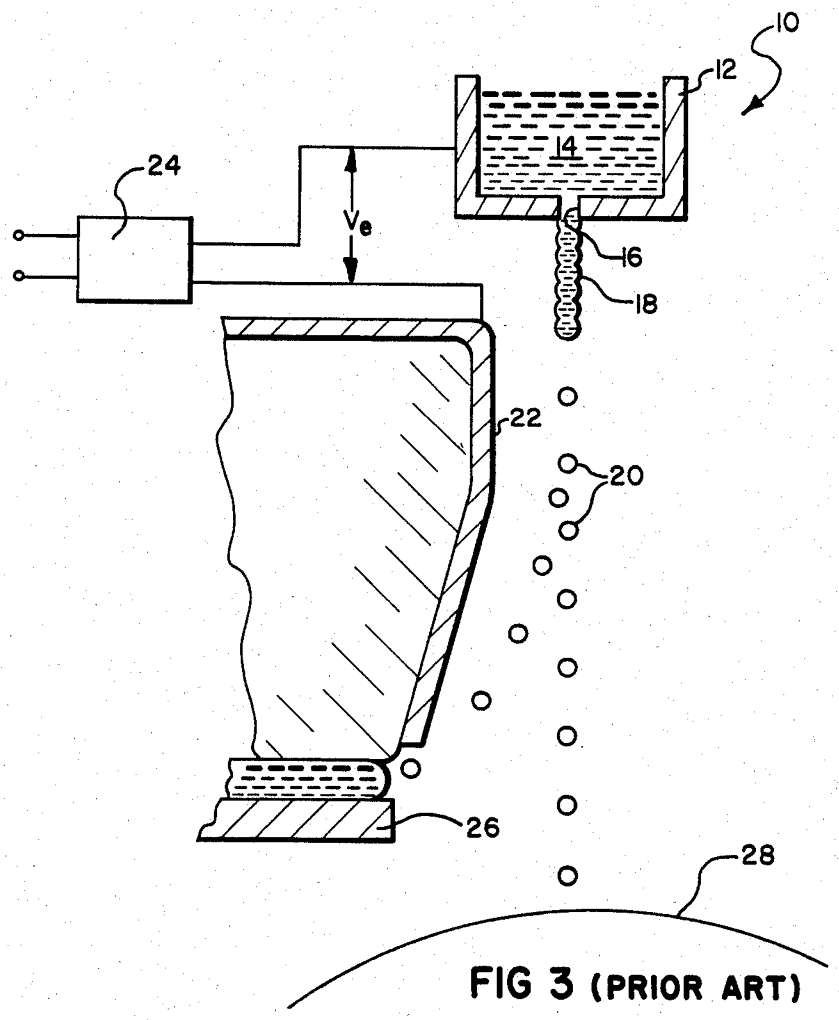
FIG 3 (PRIOR ART)
FIG. 3 is a schematic diagram of a prior art ink jet printing head having an extended drop charging electrode for ink drop deflection.

FIG. 1 shows an ink jet printing head 10 having a planar nonextended drop charging electrode according to the present invention, where elements similar to elements in the prior art printing head shown in FIG. 3 are similarly numbered.

Printing head 10 includes an ink reservoir 12 containing conductive ink 14 under pressure. The ink is forced from an orifice 16 to form an ink filament 18. The ink is vibrated by means not shown to cause the ink jet filament to reliably break up into drops 20. The ink drops are selectively charged by voltage $V_C$ applied to a nonextended planar drop charging electrode 22 from a charging circuit 24. Charged drops are deflecting by nearly instantaneous interaction with the nonextended planar drop charging electrode 22 onto the face of a drop catcher 26, and uncharged drops proceed to the printing surface 28. No means other than the nonextended planar drop charging electrode 22 is provided for causing the drops to deflect onto the face of drop catcher 26. A preferred range of lengths for the drop charging electrode 22 for use in the present invention is between 1 and 6 drop spacings long a 'drop spacing' is the distance d between centers of two consecutive drops in the ink jet (see FIG. 1).

Figure 2:
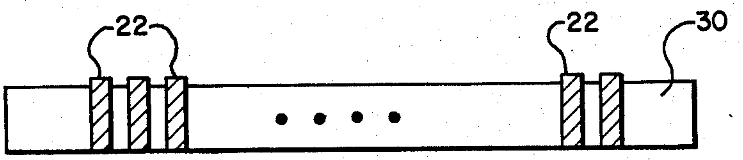
FIG. 2 is a plan view of the drop charging electrode structure in a multi-jet ink jet print head according to the present invention.

According to a presently preferred mode of practicing the invention, the ink jet print head produces 64 ink jets from a line of orifices 31 μm in diameter, and spaced on 84.6 μm centers. The ink jets are stimulated in syncronism at 75.1 kz. The nonextended planar drop charging electrodes are carried by a charge plate 30. An end view of the charge plate 30 showing the planar nonextended drop charging electrodes 22 is shown in FIG. 2. Each electrode 22 is 50.8 μm wide and 965 μm long and spaced on 84.6 μm centers. For the ink jet filament produced and stimulated as described above, this length of electrode corresponds to approximately 6 drop spacings. It has been found through experiment that an electrode having a length of as little as 1 drop can be used to reliably deflect charged drops.

Figure 4:
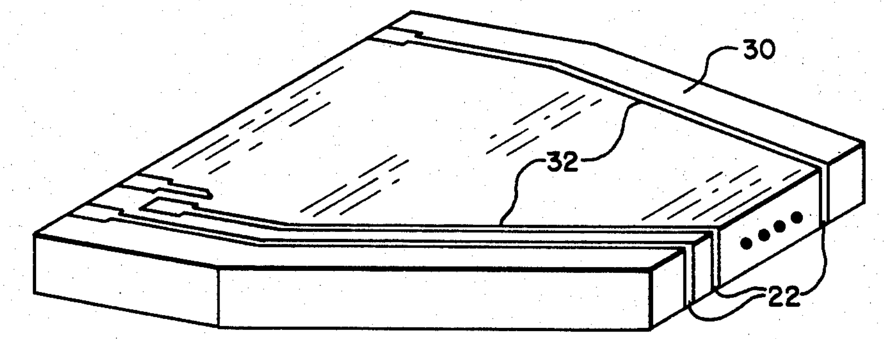
FIG. 4 is a perspective view of an electrode plate having nonextended drop charging electrodes according to the present invention.

FIG. 4 is a perspective view of the charge plate 30, showing the planar nonextended drop charging electrodes 22 and electrical conductors 32 for electrically addressing the electrodes.

Referring to FIG. 1, in the preferred mode of practicing the invention, the drop catcher 26 is formed from molded plastic thereby reducing the cost of manufacture. Since all necessary drop deflection is performed by the planar nonextended drop deflection electrodes 22, there is no need for the drop catcher to be made from electrically conductive material, or to include thereon the electrically conductive electrode for drop deflection.

Although the preferred mode of practicing the invention has been described with reference to an ink jet print head for a continuous binary type ink jet printer, the principle of the present invention can also be applied to the type ink jet printer where the drops are deflected along several printing trajectories.

INDUSTRIAL APPLICABILITY AND ADVANTAGES

The ink jet printing head according to the present invention is useful in continuous ink jet printing apparatus. The ink jet printing head is advantageous in that by eliminating the need for separate drop deflecting means, the construction of the ink jet printing head is simplified, thereby reducing its manufacturing cost. Since the drop catcher in the ink jet printing head does not need to be conductive, or include a conductive electrode, it may be simply constructed of molded plastic.

The invention has been described in detail with reference to a particular embodiment, however, it will be understood that variations and modifications can be made within the spirit and scope of the invention as defined by the accompanying claims.

I claim:

1. A print head for a continuous ink jet printer, of the type having planar electrode drop charging means disposed adjacent the drop separation point of an ink jet filament and a drop catcher having a vertical drop catching face extending generally parallel to the ink jet filament, and means for deflecting charged ink drops into said drop catching face, characterized by said drop charging means and drop deflection means comprising a single, nonextended, planar electrode positioned near the drop separation point of the ink jet filament, nonextended meaning that the planar electrode does not extend onto said drop catching face.

2. The ink jet print head claimed in claim 1, wherein the drop charging and deflecting electrodes are between 1 and 6 drop spacings long.

3. The ink jet print head claimed in claim 1, wherein the drop catcher comprises molded plastic material.

4. A print head for a continuous multijet ink jet printer, comprising:

- means for forming a plurality of ink jets arranged in a line, each ink jet defining an ink filament separating into drops at a drop separation point;
- a corresponding plurality of planar electrodes located adjacent the drop separation points of the respective ink jet filaments for charging and deflecting ink drops;
- a drop catcher having a vertical drop catching face extending generally parallel with the ink jet filaments, said drop catching face being located below said planar electrodes; and
- an ink gutter located at the bottom of said drop catching face, whereby ink drops deflected onto said drop catching face by said planar electrodes flow down said face into said gutter.

* * * * *